US00H002095H

(19) United States

(12) Statutory Invention Registration (10) Reg. No.: US H2095 H

Young (43) Published: Jan. 6, 2004

(54) FAT SUBSTITUTED AND ITS PREPARATION

(75) Inventor: Timothy J. Young, Tenafly, NJ (US)

(73) Assignee: FMC Corporation, Philadelphia, PA (US)

(21) Appl. No.: 08/757,689

(22) Filed: Dec. 3, 1996

(51) Int. Cl.[7] ..... A23G 3/00; A23L 1/05

(52) U.S. Cl. ..... 426/658; 426/573

(58) Field of Search ..... 426/658, 573

(56) References Cited

U.S. PATENT DOCUMENTS

| | | | | | |
|---|---|---|---|---|---|
| 3,023,104 | A | * | 2/1962 | Battista | |
| 3,573,058 | A | * | 3/1971 | Tiemstra | |
| 4,564,525 | A | * | 1/1986 | Mitchell et al. | 426/104 |
| 4,871,574 | A | * | 10/1989 | Yamazaki et al. | 426/622 |
| 5,011,701 | A | * | 4/1991 | Baer et al. | 426/573 |
| 5,169,671 | A | | 12/1992 | Harada et al. | 426/658 |
| H1229 | H | * | 9/1993 | McGinley et al. | 426/654 |
| 5,366,755 | A | * | 11/1994 | Timonen et al. | 426/658 |
| 5,422,346 | A | * | 6/1995 | Mitchell et al. | 514/54 |
| 5,429,830 | A | * | 7/1995 | Janovsky et al. | 426/94 |
| 5,436,329 | A | * | 7/1995 | Caboche | 536/103 |
| 5,468,512 | A | | 11/1995 | Verschuren et al. | 426/658 |
| 5,478,732 | A | * | 12/1995 | Kunz et al. | 435/101 |
| 5,501,869 | A | | 3/1996 | Buliga et al. | 426/658 |
| 5,525,368 | A | * | 6/1996 | Rha et al. | 426/658 |
| 5,527,556 | A | | 6/1996 | Frippiat et al. | 426/658 |
| 5,543,162 | A | * | 8/1996 | Timonen et al. | 426/89 |
| 5,569,483 | A | * | 10/1996 | Timonen et al. | 426/658 |
| 5,626,901 | A | * | 5/1997 | Ambjerg Pedersen | 426/589 |
| 5,629,041 | A | * | 5/1997 | Laaman et al. | |
| 5,709,896 | A | * | 1/1998 | Hartigan et al. | |
| 5,789,004 | A | * | 8/1998 | Hogan et al. | |
| 6,048,564 | A | * | 4/2000 | Young et al. | |
| 6,120,809 | A | * | 9/2000 | Rhodes | |
| 6,132,793 | A | * | 10/2000 | Benesh | |
| 6,149,962 | A | * | 11/2000 | Loh et al. | |

FOREIGN PATENT DOCUMENTS

| | | |
|---|---|---|
| EP | 0 388 572 | 9/1990 |

OTHER PUBLICATIONS

"Use of Inulin as a Natural Texture Modifier", R.F. Silva, *Cereal Foods World*, pp. 792–794 (Oct. 1996).

Product Brochure published by Orafti, a daughter company of Raffinerie, relating to Raftiline® and Raftilose®, p. 2.

"Innovative Food Products with inulin and oligofructose", Franck–Frippiat, A.; 1st Orafti Research Conference; pp. 182–185 (more than one year ago).

* cited by examiner

*Primary Examiner*—Charles T. Jordan

*Assistant Examiner*—Aileen B. Felton

(74) *Attorney, Agent, or Firm*—Bruce M. Monroe; I. Robert Silverman; Patrick Baker

(57) ABSTRACT

An inulin/colloidal hydrolyzed cellulose composition as a fat substitute. Processes for preparing an inulin/colloidal hydrolyzed cellulose composition by forming a paste or by spray drying. A fat substitute gel. A food containing inulin/colloidal hydrolyzed cellulose.

33 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FAT SUBSTITUTED AND ITS PREPARATION

FIELD OF THE INVENTION

This invention relates to a food additive comprising inulin and colloidal hydrolyzed cellulose. More particularly, this invention relates to a composition and process for making a composition which may be used as a substitute for fat in foods.

BACKGROUND OF THE INVENTION

The amount of fat, particularly saturated fat, in foods has been linked to potentially unhealthy effects, for example atherosclerosis. Consumers now seek out foods with a reduced fat content or fat-free foods to avoid what is believed to be adverse effects of the fat-containing food.

In response to the desire for foods with low or no fat content, various foods are now on the market which are lower in fat content or in which the fat content has been eliminated. These foods, although lower in fat, require consumers to compromise on the taste and texture of the food in order to benefit from such lower fat-containing foods.

Inulin is a naturally occurring material which-may be obtained industrially from chicory root. Inulin has been used as a fat substitute in foods, and gives the necessary fat-like texture to foods. When inulin is added, as a fat substitute, to a food, the inulin gels slowly, and requires a solid content that is excessive. Additionally, the inulin may be incorporated into certain foods with processing difficulties.

U.S. Pat. No. 5,501,869 teaches a fat mimetic for use in foods which includes a maltodextrin or acid modified starch, a branched chain amylopectin, and, as a texturizing agent, inulin. Microreticulated microcrystalline cellulose is also added to the formulation in order to reduce the sweetness which, the patent teaches, occurs in a non-fat spreadable margarine product and squeezable margarine product which contain inulin at levels above about 23%.

U.S. Pat. No. 5,169,671 is directed to a reduced fat, oil or sugar food, and drink. The patent teaches using a polyfructan as a substitute for such oils, fats and sugars. The patent also teaches that the polyfructan composition has a creamy taste and texture equivalent to that of fats and oils. The '671 patent teaches a fructose polymer having a beta-2,1 bond as a whole or partial substitute for the fats or oils. The '671 patent also teaches the use of gelation materials, thickening agents, and low calorie sugars.

U.S. Pat. No. 5,468,512 relates to a fat-replacement ingredient which is an oligofructose such as inulin, irisin and lycorisin. The '512 patent teaches that oligofructoses of the inulin type, are composed mainly of beta-2,1 bonds, and are used as fat or oil substitutes in food production. The '512 patent further teaches that preferred oligofructoses are low calorie polysaccharides of the inulin type.

U.S. Pat. No. 5,527,556 is directed to a creamy composition which may comprise inulin, a liquid and other components such as salts, carbohydrates, proteins and gums. The creamy composition may be added to a food product as a fat substitute. Instead of being added to a food product as a creamy composition, the composition of the '556 patent may be dried and added to a food product as a dry powder provided the food product is sufficiently liquid to hydrate the dry powder.

"*Use ofinulin as a Natural Texture Modifier*"; R. F. Silva, Cereal Foods World; 41 (10), pages 792–794 (Oct. 1996), discloses that inulin juice is concentrated and spray-dried to yield a powder having 96% of dry matter.

"*Innovative food products with inulin and oligofructose*"; Franck-Frippiat, A.; 1st Orafti Research Conference; pages 182–185 (more than one year ago) discloses the diffusion of inulin in hot water followed by refining and spray-drying.

A product brochure directed to Raftiline® and Raftilose® inulin and oligofructose, published by Orafti, "... a daughter company of Raffinerie Tirlemontoise." (more than one year ago) discloses on page 2 thereof that inulin is extracted from a vegetable source with hot water, purified and spray-dried to a powder. The degree of polymerization of the inulin powder is dependent upon the purification process used prior to spray-drying.

None of the references teach or suggest a fat substitute which comprises inulin and colloidal hydrolyzed cellulose or a process for preparing such a fat substitute.

SUMMARY OF THE INVENTION

Broadly, this invention contemplates a composition comprising rod-like colloidal hydrolyzed cellulose particles with lamellar inulin particles.

This invention also contemplates a process for preparing an inulin-colloidal hydrolyzed cellulose composition comprising dissolving or slurrying the inulin in water, adding colloidal hydrolyzed cellulose wet cake to the solution or dispersion, shearing the dispersion of inulin and cellulose to obtain a uniform dispersion, and either forming a paste or spray drying the uniform dispersion having a solids content of at least about 15%.

The spray-dried inulin-colloidal hydrolyzed cellulose compositions of this invention, enhance the performance of the inulin by forming a unique composition of two shapes of particles which are interspersed with one another.

When the composition of this invention is an interspersed composition, the colloidal hydrolyzed cellulose particles cannot be separated from the inulin particles by ordinary physical means such as centrifugation and the like.

An interspersed composition may be prepared by mixing an inulin slurry or solution with a colloidal hydrolyzed cellulose wetcake and subjecting the mixture to shearing or attriting or comilling such as in a colloidal mill.

Shearing involves applying opposing forces to the inulin/colloidal hydrolyzed cellulose wetcake mixture. The opposing forces are close together and application of a shearing force results in a stronger physical attraction or interaction between the inulin particles and the colloidal hydrolyzed cellulose particles.

Attrition is a reduction of the particle size to bring about interspersion.

When the composition is added to a food, as a fat substitute, the addition results in a food which contains a significantly reduced amount of inulin to achieve an improved texture, excellent eating quality, longer shelf life and greater stability than a food which contains inulin alone as received from an inulin manufacturer.

The above benefits are also obtained when the composition is a paste such as will result from adding attrited colloidal hydrolyzed cellulose wetcake to inulin, which may not necessarily have been spray-dried, and shearing the mixture as well as to a composition which is a powder.

In order to achieve all or some of the above benefits, the inventive composition has a number of different aspects:

If inulin, as received from the manufacturer, whether already spray-dried or not, is spray-dried at a solids content of at least 15%, the resultant product, when added to a food may be added to a food in a lesser amount than inulin as received from the manufacturer and will result in an improved viscosity, gel strength, improved texture, good mouthfeel, excellent eating quality, smoothness and the like.

If attrited colloidal hydrolyzed cellulose wetcake is added to spray-dried inulin and the mixture sheared, a paste is formed which has an improved rheology and texture.

If attrited colloidal hydrolyzed cellulose is sheared with inulin as received from the manufacturer a paste may be formed which has an improved texture and rheology.

If colloidal hydrolyzed cellulose wetcake is added to inulin, the mixture sheared, dispersed, homogenized and spray-dried, when the resultant powder is reconstituted in the food or reconstituted prior to addition to the food and used in a food, the food will have an improved texture and rheology.

The particular inventive composition which is used, and its manner of preparation will depend, to a large extent, on the ultimate use of the composition and the type of food with which it is to be used.

DETAILED DESCRIPTION OF THE INVENTION

Unless specified otherwise, as used in the specification and claims, all percentages given are percent by weight.

The composition of this invention comprises rod-like colloidal hydrolyzed cellulose particles with lamellar inulin particles. The particles are believed to form a network which provides the unique properties of the combination.

The claimed composition may be prepared by dissolving or dispersing inulin in water. Thereafter, a wet hydrolyzed colloidal cellulose filter cake which has been prepared from acid hydrolysis of a cellulose-rich pulp is then attrited to a desired particle size and added to the inulin solution or dispersion. The combination is then sheared to obtain a uniform dispersion. The uniform dispersion is then spray dried or used as a paste.

The inulin used, as received from the manufacturer, may have been spray-dried by the manufacturer when the powder was being made. In practicing this invention one may use either inulin which has not been spray-dried prior to being used in this invention or inulin which has been spray-dried by the manufacturer.

The inulin used is an oligofructose polymer wherein the degree of polymerization of the polymer is from about 4 to about 60 monomeric units. It is preferred however, that the inulin have an average degree of polymerization of from about 7 to about 18 units, more preferably 7 to about 14 units, because optimum results have been obtained thereby.

The inulin particles which are used will have an average particle size of from about 0.1 to about 50 microns, preferably 0.1 to about 20 microns, and most preferably 0.1 to about 5 microns. If the average particle size of the inulin particles exceeds an average particle size of about 20 microns, then the level of effectiveness of the composition may be adversely affected.

The colloidal hydrolyzed cellulose may be prepared by starting with a cellulose-rich pulp and hydrolyzing the pulp with acid. Next, the wet cellulose-containing filter cake is attrited to an average particle size of from about 0.1 to about 10 microns. The average particle size of the attrited wet cellulose-containing filter cake will be preferably less than 1 micron.

There are many sources of cellulose-rich material and any of these sources may be used in preparing the colloidal hydrolyzed cellulose. Among the materials that may be mentioned are plant-derived materials such as soy hulls, corn hulls, nut hulls, wood and the like.

Attrition of the hydrolyzed cellulose particles to form colloidal particles may be accomplished using any suitable apparatus such as a Silverson® mixer. The choice of mixer will be apparent to one skilled in the art taking into consideration the particle size desired.

When the inulin-colloidal hydrolyzed cellulose composition is to be spray-dried, it should not gel on the way to the spray drier. Whether the composition will gel or not depends on the degree of polymerization of the inulin, the weight ratio of colloidal hydrolyzed cellulose to inulin and the percent of solids in the composition to be spray-dried.

In a preferred embodiment, colloidal hydrolyzed cellulose particles, in the form of a wet cellulose-containing filter cake, which has been attrited to a particle size of from about 0.1 to about 10 microns, are added to the inulin-containing dispersion or solution, and the entire mixture is then sheared to create a uniform dispersion. It is this uniform dispersion, which contains at least 15% solids, which is then spray-dried at an inlet temperature of from about 200° C. to about 280° C. and an outlet temperature of from about 100° C. to about 120° C. The resultant spray-dried material will comprise from about 40% to about 98% inulin, and from about 2% to about 60% of colloidal hydrolyzed cellulose and will be a powder having from about 2% to about 8% water.

The spray-dried composition is particularly preferred because powder is easier to transport than a dispersion, and the powder may be easier to incorporate into specific food applications, taking advantage of the water already present.

If it is desired to utilize the spray-dried inulin/colloidal hydrolyzed cellulose composition as a paste, then from about 65% to about 98% of a liquid is added and the mixture sheared to form a paste.

The paste or cream dispersion may be prepared from a composition wherein only the inulin may have been spray-dried. When the composition is prepared from inulin, whether or not it has been spray-dried, and colloidal hydrolyzed cellulose, the composition has the rod-like colloidal hydrolyzed cellulose particles interspersed with the lamellar inulin particles. The composition is sheared until a uniform dispersion is obtained. Thereafter, the composition is used as is, that is, in the form of a paste or cream dispersion. By the term "paste" we mean a dispersion which will comprise from about 2% to about 35% of solids, the remainder being liquid, such as water or milk.

Alternatively, one may dissolve or slurry the inulin in water and spray-dry only the inulin at a solids content of at least about 15%. Spray-drying of the inulin will improve the properties of the inulin, regardless of how the inulin was dried previously. The inulin may be used normally in a food or to form a paste, the choice being dictated by the food application in which it is being used.

Inulin is dissolved or dispersed in water, and the resulting solution or dispersion subjected to high shear conditions. The amount of inulin which is added to the water may vary widely so that the dispersion to be spray-dried will contain from about 15% to about 35% of solids by weight of the dispersion: Generally, the greater the solids content of the initial spray-dried composition, the greater the viscosity and stability of a gel formed with the resultant spray-dried composition.

In preparing the inulin solution, inulin is generally dissolved or slurried in water at a temperature of from about 20° C. to about 75° C. and preferably at about 40° C. to about 70° C. Inulin is partially soluble in water and the increase in temperature will increase the solubility rapidly. However, if the inulin is allowed to cool, as it cools, it will precipitate.

The inulin dispersion will be spray-dried at an inlet temperature of from about 200° C. to about 280° C., and an outlet temperature of from about 100° C. to about 120° C. The spray-dried material contains about 2–6% of water by weight. In practicing this invention, inulin which has been spray-dried in the course of its manufacture will have enhanced properties as a result of being spray-dried according to this invention.

One convenient way to measure the effectiveness of the compositions and process of this invention is to prepare a gel from the various compositions and to measure the viscosity of the gel. Generally, the firmer the gel, the more effective the composition.

The gel may be formed by dispersing an inulin/colloidal hydrolyzed cellulose spray-dried composition in water with high shear at a temperature of from about 40° C. to about 75° C. The solids content of the gel may vary from about 2%, by weight, to about 35% by weight. This will include all gels wherein the inulin to colloidal hydrolyzed cellulose ratio is as set forth before in describing the composition to be spray-dried. The gel is generally formed at temperatures of from about 30° C. to about 40° C., depending on the composition. Generally, a gel is considered formed when the viscosity of the gel is at least about 1000 centipoises. The viscosity of the gel may vary from about 1000 centipoises to about 1,000,000 centipoises as determined by a Brookfield RVT viscometer.

In forming the gel using a spray dried composition, the spray dried material (inulin plus colloidal hydrolyzed cellulose) is added to water which is at a temperature of from about 40° C. to about 75° C. It is preferable, however, that the temperature of the water, when dispersing the spray-dried composition, be above 50° C. The gel is formed by adding the spray dried powder to water and subjecting it to medium shear, such as a Silverson® mixer or by passing it through a homogenizer at low to medium pressure. The resultant material is then allowed to stand for a period of time of from about one minute to about 24 hours, depending upon the solids content of the gel. Gelation is accelerated by subjecting the resultant sheared material to refrigeration.

The gel may also be formed, as described above, using a spray-dried inulin which has been spray-dried more than once without colloidal hydrolyzed cellulose, or inulin which has not been spray-dried plus colloidal hydrolyzed cellulose or spray-dried inulin plus colloidal hydrolyzed cellulose.

Gelation will also be more rapid for a material which has a higher solids content than for a material which has a low solids content. For example, one minute might be required for a 30% solids material to gel, as compared to 240 minutes for a 5% solids material to gel.

The viscosity of the gel formed will be a function of the degree of polymerization of the inulin used, whether the inulin or inulin/colloidal hydrolyzed cellulose has been spray-dried, the solids content of the composition and the ratio of inulin to colloidal hydrolyzed cellulose.

For a given composition according to this invention having the same degree of polymerization, prepared in the same manner such as by spray-drying and the same total solids content, the gel viscosity will vary depending upon the weight ratio of colloidal hydrolyzed cellulose to inulin. There is a point at which, all other factors being equal, increasing the weight ratio of colloidal hydrolyzed cellulose to inulin will decrease the viscosity of a gel, but further increase of the amount of the colloidal hydrolyzed cellulose present will again increase the viscosity of the gel.

This point will vary from composition to composition depending on the factors set forth above. For example, for a spray-dried composition having an average degree of polymerization of 9 and a total solids content of 20 weight percent, the gel viscosity will begin to decrease when the amount of colloidal hydrolyzed cellulose is present in an amount of about 3%, will bottom out at about 30% colloidal hydrolyzed cellulose and will begin to increase when the amount of colloidal hydrolyzed cellulose present increases beyond 30%.

The composition according to this invention may be added to a food to replace some or all of the fat present in the food.

The composition, whether a powder or a paste, may be added to a food in an amount of from about 0.5% to about 10% or more, based on the weight of the composition plus food. The amount to be added will depend upon the nature of the food, whether the food is paste-like, such as mayonnaise, light such as whipped topping, or cheeselike, etc.

The composition, either a spray-dried powder of inulin and- colloidal hydrolyzed cellulose or a paste dispersion of inulin and colloidal hydrolyzed cellulose, is dispersed in water which has been heated to aid in dispersing the composition. The mixture is subjected to a high speed shearing in order to obtain a uniform dispersion. The other components of the food are then added and the composition mixed thoroughly. The reduced fat containing food may then be aged, refrigerated or packaged depending upon the type of food being prepared.

The amount of liquid added to the paste for use in a food depends on a number of factors. The amount of liquid added is influenced by the particle size of the paste components, the average degree of polymerization of the inulin present, the ratio of the colloidal hydrolyzed cellulose to the inulin and the amount of liquid already in the food. Example 10 is an example where a paste is added to water according to this invention.

The food which is prepared will have all of the normal ancillary ingredients present such as, stabilizers, preservatives, seasoning, emulsifiers, sweeteners, anti-caking agents, colorants and the like in the amounts normally present.

It is important that the pH of the gel or paste be maintained above about 3. If the pH is not maintained at that level, the inulin will be hydrolyzed into its component sugars causing the inulin composition to lose functionality.

The composition of this invention, whether it be inulin alone which has been spray-dried after receipt from the manufacturer, inulin as received from the manufacturer mixed with attrited hydrolyzed cellulose and subjected to high shear, spray-dried inulin with attrited hydrolyzed colloidal cellulose or inulin which has been mixed with attrited hydrolyzed cellulose and the mixture subjected to high shear and then spray-dried as a powder, may be added to a composition such as a food to thicken or gel the food or composition.

The foods in which the composition of this invention may be used are legion. For example, the compositions of this invention may be used to prepare confectioneries, goods to be baked, dairy products, dressings, emulsion foods, whipped toppings, cheeses and table spreads and many more.

In the examples which follow, the following inulins are used. The inulin degree of polymerization given is obtained from the various manufacturers.

Raftiline® ST has an average degree of polymerization of 9 and is obtainable from Orafti. Frutafit (Inulin-HD) has an average degree of polymerization of 9 and is obtainable from Imperial Suiker Unie. Fibruline LC is believed to have a degree of polymerization of about 14 and is obtainable from Cosucra S.A.

The viscosity of gels formed using the compositions of this invention is set forth in the examples. Generally, the more viscous the gel, the greater is the efficacy of the composition. The examples are also useful to establish viscosity profiles at different solids levels and different inulin to colloidal hydrolyzed cellulose wetcake ratios. These profiles are useful to select a solids level content and an inulin to colloidal hydrolyzed cellulose wetcake ratio for a specific food application, e.g., a reduced fat spread, non-fat frozen dessert and the like.

In order to more fully illustrate the nature of this invention and the manner of practicing the same, the following examples are presented.

Examples 11 through 17 and 21 through 24 have not actually been conducted. However, if they were conducted, it is believed they would be conducted in the manner described with the results described.

EXAMPLE 1

Spray-dried Inulin

This example illustrates the process of spray-drying inulin having different degrees of polymerization.

In a steam-heated kettle is placed 3750 grams of water which is heated to 60° C. To this hot water is added 1250 grams of inulin (Raftiline® ST, Orafti), and this mixture is stirred until the inulin is completely dissolved. The solution is transferred to a colloid mill having a 5 mm clearance, milling at 4500 rpm for 15 minutes. During milling, the slurry thickens and becomes opaque as it is cooled. This slurry is then spray-dried using a 4 foot Stork Bowen spray dryer fitted with a nozzle. The spray dryer is operated at an inlet temperature of 230° C. and an outlet temperature of 105–115° C. The spray-dried inulin powder that is recovered is then put in jars to be used as needed.

A second source of inulin, Fibruline® LC (Cosucra, S. A.), is dried in exactly the same manner. In this case the slurry gels as well as thickening and becoming opaque during the milling operation. To overcome the gelation, shearing is applied to the gelled material so that it can be pumped to the spray dryer. The Fibruline LC has a higher average degree of polymerization than the Raftiline® ST, accounting for this difference in behavior.

EXAMPLE 2

Viscosity of Coprocessed Raftiline® ST with Hydrolyzed Cellulose

This example illustrates the gel viscosities obtained at different solids contents and different ratios of inulin to colloidal hydrolyzed cellulose. Attention is invited to Table 1 which demonstrates the improvement obtained as a result of mixing the cellulose with the inulin. It is also apparent that at the weight ratio of inulin to cellulose of 30:70, and at a 30 percent solids content the beneficial effects of the composition are diminished.

In a tall, one liter, stainless steel beaker is placed 317.88 grams of water which is then heated to 65° C. Spray-dried inulin (Raftiline®ST from Example 1) weighing 78.4 grams is dissolved in the heated water which is stirred with a Lightnin® mixer. To this solution is added 3.72 grams of attrited, colloidal hydrolyzed cellulose wetcake (43 wt % solids) with stirring continuing until a uniform slurry is obtained. The ratio of inulin to attrited, colloidal hydrolyzed cellulose in this specific example is 98:2. This slurry is then dispersed using a Silverson® mixer operated at 10,000 rpm for four minutes. The total size of this sample and all subsequent samples is 400 grams. The resulting sols are poured into glass gel dishes which are placed in a 10C. water bath in which they remain for 24 hours. At the end of this period the viscosity of the gel is measured using a Brookfield RVT viscometer. The viscosity of this particular sample which contains 20 wt % solids is 6300 cps. The above procedure is repeated several times except that the weight percent of solids and the inulin to colloidal hydrolyzed cellulose ratio are varied, including making allowance for the water content of the hydrolyzed cellulose wetcake. The viscosities of representative gels are shown in Table 1.

TABLE 1

| | Inulin/HC[a] Ratio | | | | |
|---|---|---|---|---|---|
| Weight Percent Solids | 100/0 | 98/2 | 85/15 | 60/40 | 30/70 |
| | Viscosity (cps) | | | | |
| 2.5 | 20 | 20 | 20 | 30 | 70 |
| 5.0 | 20 | 20 | 20 | 40 | 430 |
| 10.0 | 100 | 120 | 50 | 120 | 950 |
| 20.0 | 2000 | 6300 | 2000 | 700 | 14,000 |
| 30.0 | 27,000 | 100,000 | 40,000 | 50,000 | 19,000 |

[a]HC stands for attrited, hydrolyzed cellulose wetcake.

EXAMPLE 3

Viscosity of Coprocessed Fibruline with Hydrolyzed Cellulose

This example illustrates the effect on gel viscosity, of using an inulin having a higher average degree of polymerization.

The procedure of Example 2 is repeated to prepare gels except that Fibruline LC is used in place of the Raftiline® ST. Only one ratio of inulin to hydrolyzed colloidal cellulose is changed from 85/15 to 80/20, but all others remain the same. The viscosities of these gels are then measured as in Example 2. The results are set forth in Table 2.

TABLE 2

| | Inulin/HC[a] Ratio | | | | |
|---|---|---|---|---|---|
| Percent Percent Solids | 100/0 | 98/2 | 80/20 | 60/40 | 30/70 |
| | Viscosity (cps) | | | | |
| 2.5 | 70 | 70 | 20 | 40 | 80 |
| 5.0 | 170 | 1000 | 250 | 1000 | 600 |
| 10.0 | 28,000 | 36,020 | 18,000 | 8800 | 2400 |
| 20.0 | 100,000 | 140,000 | 150,000 | 128,000 | 16,000 |
| 30.0 | 1,000,000 | 1,200,000 | 1,800,000 | 440,000 | 32,000 |

[a]HC stands for attrited, hydrolyzed cellulose wetcake.

Attention is invited to the fact that at the weight ratio of inulin to cellulose of 60/40 and 30/70 the beneficial effects of the composition are diminished. These compositions, however, are suitable as food additives.

EXAMPLE 4

Spray-dried Coprocessed Inulin and Hydrolyzed Cellulose

This example illustrates the process of this invention where inulin and attrited hydrolyzed cellulose wetcake are spray-dried together.

To 11.8 kilograms of water heated to 60° C. in a 20 liter vat is added 2.85 kilograms of inulin (Raftiline ST) with stirring until the inulin is completely dissolved. To this solution is added 348.8 grams of attrited, hydrolyzed cellulose wetcake (43 wt % solids). Stirring is continued to obtain a uniform slurry. When a uniform slurry containing 20 wt % solids is achieved, the mixture is transferred to a colloid mill operated at 4500 rpm with a 5 mm clearance. Milling is continued for 15 minutes after which the slurry is dried using a 4 foot Stork Bowen spray dryer fitted with a nozzle. The spray dryer is operated at an inlet temperature of 230° C. and an outlet temperature of 105–115° C. The recovered spray-dried, coprocessed inulin/hydrolyzed cellulose powder is then put in jars to be used as needed. The ratio of inulin to attrited, hydrolyzed cellulose in this example is 95/5. The procedure of this example is repeated to prepare spray-dried compositions wherein the compositions contain ratios of inulin to hydrolyzed cellulose of 98/2, 85/15, 75/25, 65/35, and 40/60.

A second source of inulin, Fibruline® LC (Cosucra, S. A.), is coprocessed (spray-dried) with hydrolyzed cellulose in the manner of this example. The ratios of inulin to hydrolyzed cellulose prepared are limited to 95/5 and 50/50, however.

EXAMPLE 5

Gelation Rates of Spray-dried, Coprocessed Raftiline® ST/Hydrolyzed Cellulose Powders This example demonstrates the superior properties in gel formation of a spray-dried inulin/hydrolyzed cellulose composition over inulin as received from he manufacturer and the superiority of spray-dried inulin compared to inulin received from the manufacturer.

Formulations are prepared which contain Raftiline® ST spray-dried with attrited, hydrolyzed cellulose in Example 4 at a level of 25 wt % solids. To prepare these formulations, 300 grams of water is heated to 60° C. in a tall, one liter, stainless steel beaker, and 100 grams of 95/5 coprocessed inulin and hydrolyzed cellulose powder is added to the water. The powder is dispersed in the water using a Silverson mixer operated at 10,000 rpm for four minutes. At intervals of 1, 5, 15, 30, 60 120, 1440, and 2880 minutes after dispersion is complete, the viscosity of the resulting gel is measured to demonstrate the rate of nucleation of the inulin. For comparative purposes, commercial Raftiline® ST is used as received and also as spray dried in Example 1. A second set of data is developed using formulations containing 30 wt % solids which are prepared in an identical manner by adjusting the amounts of spray-dried, coprocessed powder and water. The viscosities of the gels containing 25 wt % solids are summarized in Table 3, and those for the formulations containing 30 wt % solids are summarized in Table 4.

TABLE 3

| Inulin/ | Time (minutes) | | | | | | | |
|---|---|---|---|---|---|---|---|---|
| HC[a] Ratio | 1 | 5 | 15 | 30 | 60 | 120 | 1440 | 2880 |
| | Viscosity (cps) | | | | | | | |
| 100/0[b] | 10 | 10 | 10 | 10 | 10 | 10 | 230 | 600 |
| 100/0[c] | 120 | 120 | 740 | 2100 | 2200 | 6000 | 6100 | 6100 |
| 98/2 | 720 | 1600 | 3400 | 4900 | 6100 | 15,000 | 75,000 | 110,000 |
| 95/5 | 700 | 1300 | 3100 | 4800 | 5600 | 14,000 | 80,000 | 105,000 |
| 85/15 | 300 | 430 | 1170 | 1400 | 1500 | 2200 | 3100 | 3300 |

[a]HC stands for attrited, hydrolyzed cellulose wetcake.
[b]Commercial Raftiline ® ST, as received.
[c]Raftiline ® ST as spray dried in Example 1.

TABLE 4

| | Time (minutes) | | | | | | | |
|---|---|---|---|---|---|---|---|---|
| Inulin/HC[a] Ratio | 1 | 5 | 15 | 30 | 60 | 120 | 1440 | 2880 |
| | Viscosity (cps) | | | | | | | |
| 100/0[b] | 20 | 20 | 20 | 130 | 120 | 630 | | |
| 100/0[b] | 20 | 20 | 20 | 130 | 120 | 630 | | |
| 100/0[c] | 120 | 300 | 850 | 3800 | 5900 | 18,000 | 35,000 | |
| 98/2 | 1000 | 3200 | 5700 | 14,000 | 61,000 | 125,000 | 700,000 | >1,000,000 |
| 95/5 | 1320 | 2000 | 3700 | 9100 | 50,000 | 140,000 | 600,000 | >1,000,000 |
| 85/15 | 450 | 510 | 2200 | 1800 | 1900 | 2900 | 21,000 | 33,000 |

[a]HC stands for attrited, hydrolyzed cellulose wetcake.
[b]Commercial Raftiline ® ST, as received.
[c]Raftiline ® ST as spray dried in Example 1.

EXAMPLE 6

Gelation Rates of Spray-dried, Coprocessed Fibruline LC/Hydrolyzed Cellulose Powders This example demonstrates the superior properties in gel formation of inulin which has been spray-dried after receipt from the manufacturer, over inulin as received from the manufacturer. Further, the superiority of a spray-dried inulin/attrited hydrolyzed cellulose composition over both the inulin as received from the manufacturer and inulin spray-dried after receipt from the manufacturer is demonstrated. Finally, the efficacy of a non-spray-dried composition of inulin as received from the manufacturer dispersed with attrited, hydrolyzed cellulose wetcake is demonstrated.

Formulations are prepared which contain the Fibruline LC coprocessed with attrited, hydrolyzed cellulose in Example 4 at a level of 10 wt % solids. To prepare these formulations 360 grams of water is heated to 60° C. in a tall, one liter, stainless steel beaker, and 40 grams of 95/5 coprocessed Fibruline LC to hydrolyzed cellulose is added to the water. The powder is dispersed in the water using a Silverson® mixer operated at 10,000 rpm for four minutes. At intervals of 1, 5, 15, 30, 60 120, 1440, and 2880 minutes after dispersion is complete, the viscosity of the resulting gel is measured to demonstrate the rate of nucleation of the inulin. A second sample is prepared in which the weight ratio of Fibruline LC to hydrolyzed cellulose is 50/50. For comparative purposes, commercial Fibruline LC is used as received and also as spray dried in Example 1.

An additional formulation is prepared by dissolving 20 grams of Fibruline LC as received in 333.5 grams of water heated to 60° C. To the solution of Fibruline LC is added 46.5 grams of attrited, hydrolyzed cellulose wetcake. This slurry is dispersed in the water using a Silverson® mixer operated at 10,000 rpm for four minutes. The viscosity measurements are made as described for the other samples. The results for all of these experiments are reported in Table 5.

TABLE 5

| Inulin/HC[a] Ratio | Time (minutes) 1 | 5 | 15 | 30 | 60 | 120 | 1440 | 2880 |
|---|---|---|---|---|---|---|---|---|
| | Viscosity (cps) | | | | | | | |
| 100/0[b] | 40 | 40 | 50 | 130 | 120 | 630 | 800 | 750 |
| 100/0[c] | 50 | 60 | 60 | 300 | 300 | 750 | 23,000 | 31,000 |
| 95/5 | 200 | 300 | 400 | 14,000 | 52,000 | 85,000 | 90,000 | 75,000 |
| 50/50 | 1720 | 2000 | 3300 | 3500 | 4200 | 22,000 | 70,000 | 60,000 |
| 50/50[d] | 1450 | 1600 | 2100 | 2700 | 2800 | 2900 | 21,000 | 24,000 |

[a]HC stands for attrited, hydrolyzed cellulose wetcake.
[b]Commercial Raftiline ® ST, as received.
[c]Raftiline ® ST as spray dried in Example 1.
[d]Commercial Fibruline LC, as received, dispersed with attrited, hydrolyzed wetcakc, but not spray dried.

EXAMPLE 7

Water Retention of Centrifuged Raftiline® ST/ Hydrolyzed Cellulose Gels

This example demonstrates the stability of gels prepared using the composition of this invention. The more stable the gel, the smaller the amount of water which is separated out. The spray-dried inulin/attrited hydrolyzed wetcake is more stable than spray-dried inulin alone which is more stable than inulin as received from the manufacturer.

The water retention properties are measured for gels prepared from commercial Raftiline® ST as received, Raftiline® ST as spray dried in Example 1, and the coprocessed, spray dried Raftiline® ST/hydrolyzed cellulose powders that are prepared at 98/2 and 95/5 ratios. These gels are prepared by the method of Example 5 at solids contents of 20 wt %, 25 wt %, and 30 wt %. Upon completion of dispersion with a Silverson® mixer operated at 10,000 rpm for four minutes, the dispersion is placed in ajar which is then capped and placed in a water bath maintained at 10° C. where it is kept for 48 hours. At the conclusion of this period, 50 mL of each gel is removed from the jar and placed in a graduated centrifuge tube. The tubes are placed in an IEC/HT centrifuge which is operated at 4000 rpm for 5 minutes. The volume of water that separates from the gel is then measured and recorded. The results of this test are summarized in Table 6.

TABLE 6

| Inulin/HC[a] Ratio | Percent Solids: 20 Water (mL) | 20 Separation (%) | 25 Water (mL) | 25 Separation (%) | 30 Water (mL) | 30 Separation (%) |
|---|---|---|---|---|---|---|
| 100/0[b] | 42 | 84 | 7 | 14 | 3 | 6 |
| 100/0[c] | 27 | 54 | 0 | 0 | 0 | 0 |
| 98/2 | 11 | 22 | 0 | 0 | 0 | 0 |
| 95/5 | 0 | 0 | 0 | 0 | 0 | 0 |

[a]HC stands for attrited, hydrolyzed cellulose wetcake.
[b]Commercial Raftiline ® ST, as received.
[c]Raftiline ® ST as spray dried in Example 1.

EXAMPLE 8

Water Retention of Centrifuged Fibruline LC/ Hydrolyzed Cellulose Gels

This example demonstrates the stability of gels prepared using a different inulin.

The water retention properties are measured for gels prepared from commercial Fibruline LC as received, Fibruline LC as spray dried in Example 1, and the coprocessed, spray dried Fibruline LC/hydrolyzed cellulose powders that are prepared at 95/5, 60/40 and 50/50 ratios. These gels are prepared by the method of Example 5 at solids contents of 5 wt % and 10 wt %. Upon completion of dispersion with a Silverson mixer operated at 10,000 rpm for four minutes, the dispersion is placed in a jar which is then capped and placed in a water bath maintained at 10C. where it is kept for 48 hours. At the conclusion of this period, 50 mL of each gel is removed from the jar and placed in a graduated centrifuge tube. The tubes are placed in an IEC/HT centrifuge which is operated at 4000 rpm for 5 minutes. The volume of water that separates from the gel is then measured and recorded. The results of this test are summarized in Table 7.

TABLE 7

| Inulin/HC[a] Ratio | Percent Solids: 5 Water (mL) | 5 Separation (%) | 10 Water (mL) | 10 Separation (%) |
|---|---|---|---|---|
| 100/0[b] | 47 | 94 | 31 | 62 |
| 100/0[c] | 42 | 84 | 4 | 8 |
| 95/5 | 43 | 86 | 0 | 0 |
| 95/5 d | 44 | 88 | 0 | 0 |
| 60/40 | 20 | 40 | — | — |
| 50/50 | 21 | 42 | — | — |

[a]HC stands for attrited, hydrolyzed cellulose wetcake.
[b]Commercial Raftiline ® ST, as received.
[c]Raftiline ® ST as spray dried in Example 1.
[d]Commercial Fibruline LC, as received, dispersed with attrited, hydrolyzed wetcakc, but not spray dried.

EXAMPLE 9

Effect of Solids Content on Spray-Dried Inulin

This example demonstrates the effect of solids content of inulin dispersions being spray-dried on gel viscosity and stability of dispersions of the resulting spray-dried inulin powder. When a dispersion of inulin contains at least 15% solids, there is a dramatic increase in viscosity and gel stability over inulin spray-dried at solids levels below 15%.

350 grams of Fibruline LC, as received, is dissolved in 4650 grams of water heated at 60° C., making a solution containing 7 wt % solids. The solution is transferred to a colloid mill having a 5 mm clearance, milling at 4500 rpm for 15 minutes. During milling, the slurry thickens and becomes opaque as it is cooled. This slurry is then spray-dried using a 4 foot Stork Bowen spray dryer fitted with a nozzle. The spray dryer is operated at an inlet temperature of 230° C. and an outlet temperature of 105–115° C. The spray-dried inulin powder that is recovered is then used to prepare a gel containing 10 wt % solids by the method of Example 6. This gel is placed in ajar which is then capped and placed in a water bath maintained at 10C. where it is kept for 48 hours. At the conclusion of this period, 50 mL of the gel is removed from the jar and placed in a graduated centrifuge tube. The tube is placed in an IEC/HT centrifuge which is operated at 4000 rpm for 5 minutes. The volume of water that separates from the gel is then measured and recorded. In addition, the viscosity of the gel is measured at the same time using a Brookfield RVT viscometer. Similarly, other solutions of Fibruline LC containing 12 wt %, 18 wt %, and 25 wt % solids are spray dried. The percentage separation of each gel is measured by centrifugation and their viscosities are measured using a Brookfield viscometer. The results of these experiments are recorded in Table 8.

TABLE 8

| Fibruline LC (wt % Solids)[a] | Viscosity (cps) | Water (mL) | Separation (%) |
|---|---|---|---|
| 7 | 650 | 41.5 | 83 |
| 12 | 1100 | 12.5 | 75 |
| 18 | 29,000 | 2.5 | 5 |
| 25 | 42,000 | 0.5 | 1 |

[a]The percentage of inulin solids in the aqueous solution of inulin that is spray dried.

EXAMPLE 10

Reduced Fat Spread

A 1000 gram paste dispersion containing 16.5 wt % Inulin HD (Imperial-Suiker Unie, Sugar Land, Tex.) and 16.5 wt % of attrited, hydrolyzed cellulose wetcake (43 wt % solids) is prepared by heating 451.8 grams of water to 60° C. and dissolving 165 grams of inulin in it. In this solution of inulin is dispersed 383.7 grams of hydrolyzed cellulose wetcake using a Silverson® mixer operated at 8000–10,000 rpm for 5 minutes. This dispersion contains a 50:50 ratio of inulin solids to attrited, hydrolyzed cellulose. Portions of this dispersion are used in each of the following examples as well as this example.

An aqueous phase is prepared by dispersing 15 grams of the above paste dispersion in 281.65 grams of water heated to 60° C. and stirred with a Lightnin+ mixer at 1400–1800 rpm. To this dispersion are then added 2.5 grams of salt and 1.0 gram of potassium sorbate. When these components are fully incorporated, 0.4 gram of xanthan gum is added with stirring. After achieving a uniform mixture, the temperature is reduced to 42° C. Simultaneously, a separate lipid phase is prepared by melting 100 grams of soybean oil, 58.2 grams of hydrogenated soybean oil, and 39.5 grams of refined palm oil. This mixture is stirred until its is uniformly mixed. Approximately 20 grams of the molten fats is transferred to a separate container to which is added 1.75 grams of Dimodan® OK emulsifier (Grindsted Products, Inc.). This mixture is heated to 80–85° C. until the mixture is uniform. This mixture containing the emulsifier is then added back into the remainder of the lipid mixture which is stirred until it is uniform after which it is cooled to 42° C. The lipid phase is stirred with a Lightnin® mixer, and the aqueous phase is added to the lipid phase, creating a crude, uniform water-in-oil emulsion. This emulsion is passed through a two stage chilling unit operated at an inlet temperature of 40–42° C.; a refrigerant temperature in both stages of 0C.; an agitation rate in the first and second stages, respectively, of 100 rpm and 800 rpm; and a throughput rate of 50–55 kilograms/hour. The product emerges at a temperature of 14° C. It has fat-like rheology and the characteristic spreadability of full fat spreads as well as full fat body and mouthfeel. The inulin content as a weight percent of the food product is 0.49 percent.

EXAMPLE 11

Nonfat Frozen Dessert

To 53.45 grams of water heated to 60° C. in a 1000 mL beaker and stirred with a Lightnin® mixer is added 20 grams of the dispersion prepared in Example 10. When the mixture is uniform, 319.85 grams of condensed skim milk, 20% serum solids; 31.25 grams of corn syrup, 42 (dextrose equivalents); 13.9 grams of light cream, 18% fat; and 0.5 gram of Allkream III (Alko Research, The Netherlands) are added to the dispersion and mixed thoroughly. The heat is increased to 71.1° C., and a dry blend of 60 grams of sugar, 0.9 gram of xanthan gum, and 0.15 gram of SeaKem® IC 614 carrageenan (FMC Corporation, Philadelphia, Pa.) is added slowly with good agitation. The complete mixture is heated at 71.1° C. for 30 minutes after which it is homogenized with the first stage at 13,789.5 kPa (2000 psi) and the second stage at 3447.4 kPa (500 psi). The mixture is cooled to 4.4° C. while being agitated and then is aged in a refrigerator overnight. After aging, the mixture is frozen to the appropriate draw temperature, packed into containers, and placed in a hardening room. This product has the creamy mouthfeel and body typical of full fat frozen desserts. Furthermore, it has a smooth texture, and crystal growth is inhibited by the inulin/hydrolyzed cellulose binding the free water. The inulin content as a weight percent of the food product is 0.66 percent.

EXAMPLE 12

Reduced Fat White Sauce

To 83.62 grams of water heated to 60° C. in a 250 mL beaker and stirred with a Lightnin® mixer is added 5 grams of the dispersion prepared in Example 10. When the mixture is uniform, a dry blend of 7.5 grams of whole milk powder, 28% fat; 2.6 grams of starch (Purity® 420, National Starch and Chemical Co., Bridgewater, N.J.); 0.6 gram of salt; 0.5 gram of dried cream extract (Cumberland Packaging); 0.1 gram of onion powder; 0.04 gram of white pepper; and 0.04 gram of allspice is added to the hot dispersion with vigorous stirring. The mixture is brought to a boil and simmered for one minute. The body and mouthfeel of the resulting white sauce is similar to a full fat white sauce with a creamy, short, fat-like texture. The inulin content as a weight percent of the food product is 0.83 percent.

EXAMPLE 13

Soft Set Low Fat Pudding

To 392.35 grams of skim milk heated to 60° C. in a sauce pan and stirred with a Lightnin® mixer is added 20 grams of the dispersion prepared in Example 10. When the mixture is uniform, a dry blend of 47.75 grams of sugar, 14 grams of cocoa, 11.9 grams of dextrose, 5 grams of unmodified corn starch (National® 465 corn starch, National Starch and Chemical Co., Bridgewater, N.J.), 2.5 grams of modified starch (Melojel® modified starch, National Starch and Chemical Co., Bridgewater, N.J.). 3.75 grams of carrageenan (SeaGel® XP 1010, FMC Corporation, Philadelphia, Pa.), 1.6 grams of salt, and 1.15 grams of vanilla powder is dispersed in the inulin/hydrolyzed cellulose dispersion while maintaining the temperature at 60° C. The temperature is increased to 70° C. and maintained there for five minutes. It is then pasteurized under mild conditions before being homogenized in two stages, the first at 10,342 kPa (1500 psi) and the second at 3447.4 kPa (500 psi). The ready-to-eat pudding is then poured into appropriate containers and refrigerated. This pudding has a creamy mouthfeel and good flavor release. The viscosity of this formulation is low before it is refrigerated, making processing easy. The inulin content as a weight percent of the food product is 0.66 percent.

EXAMPLE 14

Reduced Fat Sour Cream

In a 1 liter beaker, 20 grams of the dispersion prepared in Example 10 is dispersed in 372.5 grams of water heated to 60° C. using a Lightnin® mixer for about 5 minutes. When the mixture is uniform, 3.75 grams of carboxymethylcellulose (Aqualon® 7MF, Aqualon Co., Wilmington, Del.) is added and mixed for 5–10 minutes. At the conclusion of this mixing step, a dry blend of 69 grams of skimmed milk powder, 2.25 grams of carrageenan (Gelcaring GP 379, FMC Corporation, Philadelphia, Pa.), 2 grams of artificial sour cream flavor (F6248, Givaudan), 1 gram of carrageenan (SeaGel® DP 437, FMC Corporation, Philadelphia, Pa.), and 0.4 gram of sodium benzoate is added to the dispersion and mixed. In a separate container 23.1 grams of soybean oil and 1.5 grams of lecithin are heated together until they are intimately mixed. The molten blend of fat and emulsifier is added to the formulation which is then heated at 76.7° C. (170° C.) for three minutes to solubilize the carrageenans. To this mixture is then added 4.5 grams of lactic acid. After holding the mixture for 30 seconds, it is homogenized in a single stage operated at 13,789.5 kPa (2000 psi). The hot sour cream is then placed in containers and refrigerated at 4.4° C. (40° F.). This reduced fat sour cream has a short texture and the body and mouthfeel of a full fat sour cream. The inulin content as a weight percent of the food product is 0.66 percent.

EXAMPLE 15

Fat Free Mayonnaise Style Dressing

To 142 grams of water in a 500 mL beaker is added 15 grams of starch (Purity® 69, National Starch and Chemical Co., Bridgewater, N.J.). This mixture is heated to 85–88° C. (185–190° F.) while being stirred with a Lightnin® mixer. The mixture is held at this elevated temperature for 8–10 minutes after which it is cooled to room temperature. In a 1 liter, tall, stainless steel beaker containing 213.32 grams of water is dispersed 20 grams of the dispersion prepared in Example 10 using a Silverson mixer for about four minutes. This inulin/hydrolyzed cellulose dispersion is transferred to a Hobart® bowl mixer, and a dry blend of 3 grams of xanthan gum, 2 grams of carrageenan (Viscarin® SD 389, FMC Corporation, Philadelphia, Pa. 19103), 1.50 grams of yellow mustard flour (Durkee French® Seasonings), and 3.75 grams of powdered egg yolks (Henningsen® Egg Products) is added to the dispersion and mixed for 5 minutes. Next, a dry blend of 36.25 grams of corn syrup solids, 28 DE, 10 grams of sugar, 0.25 gram of sodium benzoate, 0.25 gram of potassium sorbate, 0.025 gram of the calcium disodium salt of ethylenediamine tetraacetic acid (EDTA), 0.10 gram of ground paprika, and 1 gram of titanium dioxide is added to the dispersion. After five minutes of mixing, 0.05 gram of lemon flavor 596.149SW (Firmenich Inc.), 0.05 gram of onion powder, 0.05 gram of garlic powder, and 0.025 gram of beta carotene in 13.5 grams of soybean oil is added to the mixture in the mixing bowl and is mixed for 5 minutes. The cooled starch/water mixture previously prepared is now added to the mixture, followed by mixing for 5 minutes. A mixture of 13.75 grams of salt, 7.5 grams of 120 grain distilled vinegar, and 2.75 grams of lactic acid is added to the mixture with mixing for 5 minutes more. The mixture is transferred to a Fryma® colloid mill which is operated at a 0.3 mm separation, milling for 15 minutes. After dearating the milled mixture, it is placed in appropriate containers. The use of inulin/hydrolyzed cellulose imparts a creamy mouthfeel and a short texture to the mayonnaise. The inulin content as a weight percent of the food product is 0.68 percent.

EXAMPLE 16

Reduced Fat Ranch Salad Dressing

In a 1000 mL beaker, 20 grams of the dispersion prepared in Example 10 is dispersed in 372.5 grams of water heated to 60° C. using a Lightnin® mixer for about 5 minutes. Upon completion of dispersion, a dry mixture of 2 grams of xanthan gum and 20 grams of sugar is added to the dispersion and mixed for an additional 5 minutes. When mixing is complete, this dispersion is transferred to a Waring blender. Slowly, 17.5 grams of natural buttermilk powder #21741, 0.05 gram of calcium disodium EDTA, 0.05 gram of ribotide, 0.5 gram of potassium sorbate, and .2.5 grams of powdered egg yolks (Henningsen® Type Y-1) are added to the blender and mixed for 5 minutes. Next, 50 grams of soybean oil and 2 grams of natural buttermilk flavor (Tastemakert #250897) are added and mixed for 5 minutes. At the conclusion of this period, 25 grams of white, distilled vinegar, 10 grams of salt, 1.5 grams of monosodium glutamate, 0.25 gram of mustard flour, 0.9 gram of garlic powder, 0.9 gram of onion powder, 0.25 gram of ground black pepper, and 0.1 gram of parsley are added to the blender and mixed for 5 minutes. The entire mixture is milled in a Fryma® mill operated at a separation of 0.3 mm. After dearation, it is used to fill containers for storage. The resulting reduced fat ranch-style salad dressing has a short texture with a creamy mouthfeel and the body of a full fat dressing. It further has Theological properties normally imparted to aqueous systems by a high fat content. The inulin content as a weight percent of the food product is 0.63 percent.

EXAMPLE 17

Cheese Sauce

In a 100.0 L beaker, 20 grams of the dispersion prepared in Example 10 is dispersed in 225.75 grams of water heated to 60° C. for about 5 minutes and then allowed to cool. Simultaneously, in a dry blender are mixed 3.75 grams of carrageenan (Viscarin® GP 109, FMC Corporation, Philadelphia, Pa.), 3.75 grams of carrageenan (Viscarin® SD 389, FMC Corporation, Philadelphia, Pa.), 50 grams of nonfat milk powder, 1.25 grams of mustard flour, 1 gram of monosodium glutamate, 1.25 grams of sorbic acid, and 0.4 gram of Annatto butter color. To this mixer is added 150 grams of ground skim-milk cheddar cheese, and the entire composition is mixed for 5–8 minutes. The cooled dispersion is then blended into the premix in the dry blender. To this mixture are added 1.25 grams of lactic acid, 0.25 gram of acetic acid, and 1.25 grams of Worcestershire sauce, each of which has been diluted with 10 grams of water. Also, 8.75 grams of salt and then 3.75 grams of sodium citrate are added to the contents of the blender. The cheese sauce is then heated at 76° C. for three minutes with mixing after which it is homogenized while hot, cooled, and packaged. The cheese sauce displays good meltdown properties in the mouth as well as a clean flavor. When heated, the cheese sauce maintains its viscosity and exhibits good cling, and it may be frozen without breaking down. The inulin content as a weight percent of the food product is 0.66 percent.

EXAMPLE 18

Nonfat Pasteurized Process Cheese

A dry blend is prepared containing 70 grams of sweet dairy whey, 30 grams of spray-dried Fibruline LC/hydrolyzed cellulose powder (50:50, as processed and spray dried in Example 4), 20 grams of sodium citrate, 10 grams of disodium phosphate dihydrate, 10 grams of salt, 5 grams of enzyme modified cheddar cheese, 7 grams of carrageenan (Gelcarin® GP 911, FMC Corporation, Philadelphia, Pa.), 3 grams of carrageenan (SeaKem® GP 418, FMC Corporation, Philadelphia, Pa.), and 0.4 gram of apocartotenal (Carotenal #73, Hoffinan-LaRoche, Inc., Nutley, N.J.). This dry blend is slowly added at room temperature with constant agitation to 325 grams of buttermilk (0.5%-butterfat) in a large bowl. The resulting slurry is mixed until it has a smooth appearance and is then placed in a jacketed Stephan Cooker (Model UMC-5) which is heated with 90° C. water. The lid of the cooker is closed, and the mixture is heated at 60° C. while being stirred at 300 rpm. Skim milk cheese (517.6 grams) is cut into cubes approximately 10 cm on a side which are then added to the heated mixture in the Stephan Cooker. The lid of the cooker is closed, and an 80% vacuum is pulled on it. The stirrer speed is increased to 500 rpm and cooking at 75° C. for 6 minutes is commenced. At the end of this period the vacuum is slowly released, the cooker is opened, and the molten cheese is poured into a container which is then covered and placed in a refrigerator to solidify. A comparative nonfat pasteurized process cheese is prepared in which 30 grams of Novagel® RCN-10 (coprocessed microcrystalline cellulose and guar gum, FMC Corporation, Philadelphia, Pa.) replaces the inulin/hydrolyzed cellulose powder. The cheese prepared from the inulin/hydrolyzed cellulose powder has a softer texture than the cheese prepared with the Novagele RCN-10. In addition to this improvement, the cheese has a cohesive texture which is not sticky to the touch. The inulin content as a weight percent of the food product is 1.50 percent.

EXAMPLE 19

Low fat ranch dressing prepared with spray-dried inulin

This example shows the utility of inulin which has been spray dried a second time at a high solids level in a non-fat ranch dressing.

In a large Waring blender are placed 1234.6 grams of tap water, 50 grams of Avicel® CL-611 (FMC Corporation, Philadelphia, Pa.), and 150 grams of inulin (Raftiline® ST, Orafti), which has been FMC spray-dried at 33% solids according to Example 1. This combination is mixed for 5 minutes at a rheostat setting of 70 volts. Mixing is interrupted, and 8 grams of xanthan gum (Kelco, San Diego, Calif.) is added with 2 additional minutes of mixing. Next, 100 grams of maltodextrin M- 100 (Grain Processing Corporation, Muscatine, Iowa) is added and mixed for 2 minutes. A premix (403 grams) comprising 42.18% water, 19.85% sugar, 14.89% buttermilk powder, 2.48% powdered egg yolks, 1.24% mustard flour, 0.9% garlic powder, 0.9% onion powder, 4.96% soybean oil, 1.99% buttermilk flavor, 0.64% potassium sorbate. 0.04% EDTA, and 9.93% salt is added and mixed for one minute. A premix (53 grams) comprising 85% 120 grain vinegar and 15% lactic acid (88%), 0.4 gram of parsley, and 1.0 gram of ground black pepper is added, and the mixture blended for 2 minutes. The dressing is placed in 8 oz. jars. The viscosity of the dressing after one hour is 8400 cps, and after 24 hours at room temperature the viscosity is 8800 cps. The viscosity of a sample refrigerated for 24 hours is 10,300 cps. The texture of this dressing is described as being short. The taste is good. The inulin content as a weight percent of the food product is 7.51 percent.

EXAMPLE 20

Low fat mayonnaise prepared with 50/50 coprocessed, spray-dried attrited hydrolyzed cellulose and inulin This example shows the effect on viscosity and texture of using different inulins coprocessed and spray dried with attrited, hydrolyzed cellulose as well as one of the inulins as received from the supplier. The longer chain inulin, Fibruline® LC, provides higher viscosity and a longer, stringier texture, whereas, the Frutafit® inulin as sold commercially produces less than one-half the viscosity of the same inulin coprocessed and spray dried with attrited hydrolyzed cellulose.

In a large Waring blender are placed 541.8 grams of water and 60 grams of inulin (Frutafit®, Imperial-Suiker Unie, Sugar Land, Tex.) coprocessed with attrited, hydrolyzed cellulose at a 50/50 ratio according to the method of Example 4. This combination is mixed for 5 minutes at a rheostat setting of 70 volts, then, 8 grams of xanthan gum is added and mixed for two minutes. Next 20 grams of an instant starch (Ultra Tex® 4, National Starch and Chemical Co., Bridgewater, N.J.) and 40 grams of 24 DE corn syrup solids (Frodex® 24, Arnaizo) are added and blended for 2 minutes. A premix (130.12 grams) comprising 30.76% water, 1.85 % mustard flour, 4.61% powdered egg yolks, 17.28% soybean oil, 15.37% sugar, 0.3% sodium benzoate, 0.3% potassium sorbate, 0.03% calcium disodium EDTA, 16.9% salt, 9.22% 120 grain vinegar, and 3.38% lactic acid (88%) is added and mixed for 2 minutes. The mayonnaise is then run through a colloid mill, deaerated, and placed in 8 oz. jars. The viscosity of the mayonnaise after one hour is 50,000 cps, and after 24 hours at room temperature the viscosity is still 50,000 cps. The viscosity of a sample refrigerated for 24 hours is 64,000 cps. The texture of this dressing is described as being desirably long with balanced release of flavor. This particular formulation is Example 20A.

For comparison, using the same method, Frutafit® inulin as it is sold commercially and spray-dried, coprocessed Fibruline® LC (50/50, prepared in Example 4) are used in mayonnaise dressings. The viscosities of each of these formulations are shown in Table 9. The inulin content as a weight percent of the food product is 3.75 percent.

TABLE 9

| | Example | | |
|---|---|---|---|
| | 20A[a] | 20B[b] | 20C[c] |
| | Viscosity (cps) | | |
| After one hour | 50,000 | 54,000 | 18,000 |
| After 24 hours | 50,000 | 66,000 | 22,000 |
| After 24 hours at 4.4° C. | 64,000 | 90,000 | 28,000 |

[a]Inulin HD, Imperial-Suiker Unie, Sugar Land, TX, coprocessed 50/50 with attrited, hydrolyzed cellulose. The texture of this mayonnaise is desirably long with balanced release of flavor.
[b]Fibruline ®LC, Cosucra S. A., coprocessed 50/50 with attrited, hydrolyzed cellulose. The texture of this mayonnaise is described as being elastic, long, and stringy. Not as pleasing as 20A.
[c]Inulin HD, Imperial-Suiker Unie, Sugar Land, TX, used as it is sold commercially. The texture is more like 20A, but the viscosity is significantly reduced, and the mayonnaise has poor release of flavor.

EXAMPLE 21

Reduced fat baker's whipped topping

In a large Waring blender are placed 436.1 grams of water, 14 grams of inulin (Frutafit®, Imperial-Suiker Unie, Sugar Land, Tex.) coprocessed with attrited, hydrolyzed cellulose at a 50/50 ratio according to the method of Example 4, and 4.2 grams of Avicel® RC-581. This mixture is dispersed at high speed for five minutes after which 1.05 grams of carboxymethyl cellulose (Aqualon 7HF, Hercules, Inc.) is added slowly. The dispersion is mixed for 5 more minutes. A dry blend of 87.5 grams of nonfat dry milk solids and 63 grams of sugar is prepared and added to the aqueous mixture with 5 minutes of mixing. Next, 42 grams of corn syrup solids, 42 D.E. is added to the mixture which is then heated to 62.8° C. (145° F.). In a separate container 49 grams of partially hydrogenated vegetable oil (Paramount® B, Van Den Burgh Foods), 2.1 grams of Polysorbate 60, and 1.05 grams of distilled monoglycerides (Myverol® 1835, Quest) are heated-to 60° C. (140° F.) and thoroughly blended. The hot mixture of fat and emulsifiers is added with continued mixing to the aqueous mixture when it attains the maximum temperature of 62.8° C. (145° F.). After the mixture is completely blended, the temperature is raised to 71.1 ° C. (160° F.) at which it is pasteurized for 30 minutes. The mixture is passed through a one-stage homogenizer at 17,236 kPa(2500 psi). The mixture is then cooled to 4.4° C. (40° F.) and aged for 24 hours at this temperature. At the conclusion of the aging period, the mixture is placed in a chilled 4.73 liter (5 qt) Hobart® mixer bowl. The mixer is equipped with a wire whip attachment which is operated at high (#3) speed for 2.5–3 minutes, producing a whip with at least 200% overrun. This whipped topping has the body and creamy mouthfeel of a high fat topping as well as desirable stiffness to stand up and peak. There is no syneresis observed with this topping. The inulin content as a weight percent of the food product is 1.00 percent.

EXAMPLE 22

Rotary molded base cake for sandwich creme cookies

In a Hobart® mixing bowl are placed 68.6 grams of shortening, 3.2 grams of Datem® 1118 emulsifier (Quest International), 3.2 grams of sodium stearoyl lactylate, and 3.2 grams of lecithin (Centrolex® F, Central Soya). This mixture is creamed well at medium speed for 3 minutes. The addition of 181.1 grams of inulin (Frutafit®, Imperial-Suiker Unie, Sugar Land, Tex.) coprocessed with attrited, hydrolyzed cellulose at a 50/50 ratio according to the method of Example 4 is followed by mixing at speed #1 for 3 minutes. Next, 164.2 grams of sugar (6X) is added, and mixing is continued for 2 minutes at speed #1. Cocoa powder (48.9 grams, 10–12% fat) is added and mixed for one minute at speed #1. High fructose corn syrup 62.1 grams (Isosweet® 100, A. E. Staley Manufacturing Company) is added and stirred into the mixture. A solution of 4.9 grams of ammonium bicarbonate in 40 grams of water is prepared and added to the mixture with good mixing. Water (28.8 grams) is added, and the mixture is stirred for four minutes at speed #1. Finally, 383.2 grams of flour, 3.7 grams of salt, and 4.9 grams of sodium bicarbonate are added and mixed at speed #1 for 4 minutes. The soft dough produced in this manner is less sticky than a full fat dough, facilitating easy processing in the rotary molder. This mixture is placed in a rotary molder to prepare cookies which are baked at 204.4° C. (400° F.) for 6–8 minutes. These base cakes contain 3.5–4% water. An additional advantage of this method of preparing the base cakes is that the water content of the dough is reduced, thereby reducing the baking time required for the finished cakes. The inulin content as a weight percent of the food product is 10.91 percent.

EXAMPLE 23

Reduce fat creme cookie filling

In a Hobart® mixing bowl are placed 75 grams of high fructose corn syrup (Isosweet® 100, A. E. Staley Manufacturing Company), 50 grams of glycerin, 3 grams of water, and 0.5 gram of vanilla flavoring. This combination is mixed at speed #1 for 3 minutes using a mixing paddle. The addition of 37 grams of inulin (Frutafit®, Imperial-Suiker Unie, Sugar Land, Tex.) coprocessed with attrited, hydrolyzed cellulose at a 50/50 ratio according to the method of Example 4 is followed by mixing at speed #1 for 2 minutes. Next, 309.5 grams of powdered sugar (10X) is added and mixed for 3 minutes at speed #1. Finally, 25 grams of emulsified shortening (Betricing®, Van Den Bergh Foods Company) is added, and mixing is continued at speed #1 for 4 minutes or until a smooth consistency is obtained. At this point the creme is ready to be placed on the base cakes (Example 22) and the sandwich cookies completed. This filling provides a short, creamy texture throughout the shelf-life of the cookies. It has the further advantage that it can be readily pumped and deposited on the base cake. The inulin content as a weight percent of the food products is 3.70 percent.

EXAMPLE 24

Reduced fat peanut butter

Whole, roasted peanuts (730 grams, 48.5 weight % fat) are finely ground into peanut butter which is then placed in a jacketed sigma mixer heated to 76.7° C. (170° F.). With the mixer operating, 140 grams of inulin (Frutafite, Imperial-Suiker Unie, Sugar Land, Tex.) coprocessed with attrited, hydrolyzed cellulose at a 50/50 ratio according to the method of Example 4, 50 grams of powdered sugar (10X), 50 grams of finely ground dextrose, 20 grams of a blend of distilled monoglyceride and hydrogenated, refined cottonseed oil (Monoset®, Quest International), and 10 grams of salt are added to the peanut butter. The resulting mixture is mixed with a paddle mixer for 20 minutes until the texture is smooth after which the heating fluid is changed to 4.4° C. (40° F.) water to cool the mixture. When the temperature of the mixture reaches 42.6° C. (110° F.) the finished peanut butter is placed in jars and sealed. This peanut butter contains about 75% of the amount of fat that a full fat peanut butter contains.

The composition of rod-like colloidal cellulose particles interspersed with lamellar inulin particles is unique and has been shown to beneficially affect the uniformity and consistency of the composition when used in a food.

While this invention has been described in terms of certain preferred embodiments and illustrated by means of specific examples, the invention is not to be construed as limited except as set forth in the following claims. The inulin content as a weight percent of the food product is 7.00 percent.

What is claimed is:

1. A food additive composition consisting essentially of attrited colloidal hydrolyzed cellulose, inulin, and water, in which the ratio of said attrited colloidal hydrolyzed cellulose to said inulin is in the range of 40:60 to 2:98, said composition being prepared by a process which includes the steps of:

attriting a hydrolyzed cellulose wetcake to a particle size in the range of 0.1 micron to 10 microns to produce said attrited colloidal hydrolyzed cellulose; and shearing an aqueous dispersion consisting essentially of said attrited colloidal hydrolyzed cellulose and said inulin to form a uniform dispersion, said inulin having an average particle size of from about 0.1 micron to about 50 microns, with the provisos that:

(a) said attrited colloidal hydrolyzed cellulose is not previously dried microcrystalline cellulose or microreticulated microcrystalline cellulose; and (b) said composition is in the form of a paste having from about 5% to about 35% solids or in the form of a spray dried powder having from about 2% to about 8% moisture.

2. A composition according to claim 1 wherein the inulin particles comprise inulin having an average particle size of from about 0.1 micron to about 20 microns.

3. A composition according to claim 1 wherein the inulin particles comprise inulin having an average particle size of from about 0.1 micron to about 5 microns.

4. A composition according to claim 1 wherein the inulin comprises inulin having a degree of polymerization of from about 4 to about 60 monomeric units.

5. A composition according to claim 1 wherein the inulin comprises inulin having an average degree of polymerization of from about 7 to about 18 monomeric units.

6. A composition according to claim 1 wherein the inulin comprises inulin having an average degree of polymerization of from about 7 to about 14 monomeric units.

7. A food prepared using a composition of claim 1.

8. A food comprising the composition of claim 1, said food being selected from the class consisting of confectioneries, goods for baking, dairy products, dressings, emulsion foods, whipped toppings, cheeses and table spreads.

9. A food comprising spray-dried inulin which had previously been spray dried at least once.

10. A food according to claim 9 wherein the food comprises from about 0.5% to about 10% of spray dried inulin, based on the weight of inulin plus food.

11. A process for preparing an inulin composition comprising dissolving or slurrying inulin in water, heating the slurry or solution, shearing the slurry or solution and spray drying the slurry or solution at a solids content of at least about 15%.

12. A process according to claim 11 wherein the inulin slurry or solution to be spray dried contains from about 15% to about 35% of solids.

13. A process according to claim 11 comprising spray drying the inulin at an inlet temperature of from about 200° C. to about 280° C. and an outlet temperature of from about 100° C. to about 120° C.

14. A process according to claim 11 wherein the inulin to be spray dried comprises inulin which has been spray-dried at least once.

15. A process according to claim 11 wherein the spray-dried inulin is mixed with a liquid to form a paste.

16. A process according to claim 15 wherein the paste is added to a food and mixed therewith in an amount of from about 0.5% of inulin to about 10% of inulin, based on the weight of the food and paste.

17. A process according to claim 11 comprising adding from about 2% to about 60% of colloidal hydrolyzed cellulose wetcake to the spray-dried inulin.

18. A process according to claim 17 wherein the spray-dried inulin/colloidal hydrolyzed cellulose wetcake is mixed with from about 65% to about 98% of liquid and sheared to form a paste.

19. A process according to claim 18 wherein the paste is added to a food in an amount of from about 0.5% of inulin and colloidal hydrolyzed cellulose to about 10% of inulin and colloidal hydrolyzed cellulose, based on the weight of the food and paste.

20. A process for preparing an inulin-colloidal hydrolyzed cellulose composition comprising dissolving or slurrying inulin in water, adding attrited hydrolyzed cellulose to the slurry or solution, shearing the mixture and spray-drying the sheared mixture.

21. A process according to claim 20 wherein the mixture, after shearing and before spray drying, contains from about 40% to about 98% of inulin and about 2% to about 60% of colloidal hydrolyzed cellulose.

22. A process according to claim 20 comprising adding the spray-dried composition to a food in an amount such that the inulin and colloidal hydrolyzed cellulose composition constitutes from about 0.5% of the composition to about 10% of the composition based on the weight of the food plus composition.

23. A process for preparing an inulin-colloidal hydrolyzed cellulose composition comprising dissolving or slurrying inulin in a liquid, adding attrited hydrolyzed wetcake to the slurry or solution and shearing the mixture to form a paste.

24. A process according to claim 23 wherein the paste comprises from about 2% to about 35% of solids.

25. A process according to claim 23 wherein the paste comprises from about 40% to about 98% of inulin and from about 2% to about 60% of colloidal hydrolyzed cellulose.

26. A process according to claim 23 wherein the paste is added to a food.

27. A process according to claim 26 wherein the paste which is added to a food is added in an amount of from about 0.5% to about 10% based on the weight of the paste plus food.

28. A process according to any of claims 11, 20 or 23 comprising adding the product of the process to a preparation to be used to prepare a food selected from confectioneries, goods to be baked, dairy products, dressings, emulsion foods, whipped toppings, cheeses and table spreads.

29. A food of claim 7, said food being selected from the class consisting of confectioneries, goods for baking, dairy products, dressings, emulsion foods, whipped toppings, cheeses and table spreads.

30. A food comprising a composition of claim 1, said food being selected from the class consisting of confectioneries, goods for baking. dairy products, dressings, emulsion foods, whipped toppings, cheeses and table spreads.

31. A food prepared from a composition of claim 1 wherein the inulin content of the food is in the range of about 0.5% to about 10% based on the weight of the food.

32. A food of claim 29 wherein the inulin content is in the range of about 0.5% to about 10% based on the weight of the food.

33. A composition of claim 1 wherein the solids content is in the range of about 10% to 30%.

* * * * *